(12) United States Patent
Oikawa et al.

(10) Patent No.: US 8,817,419 B2
(45) Date of Patent: Aug. 26, 2014

(54) MAGNETIC RECORDING HEAD AND MAGNETIC RECORDING APPARATUS

(75) Inventors: Soichi Oikawa, Hachioji (JP); Katsuhiko Koui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 455 days.

(21) Appl. No.: 13/171,418

(22) Filed: Jun. 28, 2011

(65) Prior Publication Data

US 2012/0002325 A1 Jan. 5, 2012

(30) Foreign Application Priority Data

Jun. 30, 2010 (JP) .................. 2010-150350

(51) Int. Cl.
*G11B 5/127* (2006.01)
*G11B 13/08* (2006.01)

(52) U.S. Cl.
USPC .................................................. 360/125.3

(58) Field of Classification Search
USPC .......................................... 360/125.3, 125.71
See application file for complete search history.

(56) References Cited

U.S. PATENT DOCUMENTS

| 7,957,098 | B2 * | 6/2011 | Yamada et al. | ............ | 360/125.3 |
| 7,982,996 | B2 * | 7/2011 | Smith et al. | ...................... | 360/59 |
| 8,139,322 | B2 * | 3/2012 | Yamada et al. | ............ | 360/125.3 |
| 8,154,825 | B2 * | 4/2012 | Takashita et al. | ........ | 360/125.71 |
| 8,208,219 | B2 * | 6/2012 | Zhang et al. | ............. | 360/125.03 |

| 2007/0297220 | A1 | 12/2007 | Yoshikawa et al. |
| 2008/0019040 | A1 | 1/2008 | Zhu et al. |
| 2008/0137224 | A1 | 6/2008 | Gao et al. |

FOREIGN PATENT DOCUMENTS

| JP | 2008-226319 | 9/2008 |
| JP | 2008-277586 | 11/2008 |
| JP | 2008-305486 | 12/2008 |
| JP | 2009-070439 | 4/2009 |
| JP | 2009-277704 | 11/2009 |
| JP | 2010-009671 | 1/2010 |
| WO | WO 2010/065753 A1 | 6/2010 |

OTHER PUBLICATIONS

Japanese Office Action dated Sep. 13, 2011, filed in Japanese counterpart Application No. 2010-150350, 6 pages (with English translation).

* cited by examiner

*Primary Examiner* — Julie Anne Watko
(74) *Attorney, Agent, or Firm* — Patterson & Sheridan, LLP

(57) ABSTRACT

According to one embodiment, a magnetic recording head includes a main magnetic pole generating a recording magnetic field in a magnetic recording medium, a return yoke paired with the main magnetic pole, and a spin torque oscillator interposed between the main magnetic pole and the return yoke and including a spin injection layer, an oscillation layer, a nonmagnetic metal layer, and spin assist layer stacked in this order, wherein the nonmagnetic metal layer includes at least one metal selected from the group consisting of Cu, Au, Ag, Al, Pd, Pt, Os, and Ir, and the spin assist layer is a soft magnetic layer whose saturation magnetic flux density (Bs), diamagnetic field coefficient (N) and gap magnetic field (Hg) show a relationship expressed by Bs×N>Hg.

2 Claims, 5 Drawing Sheets

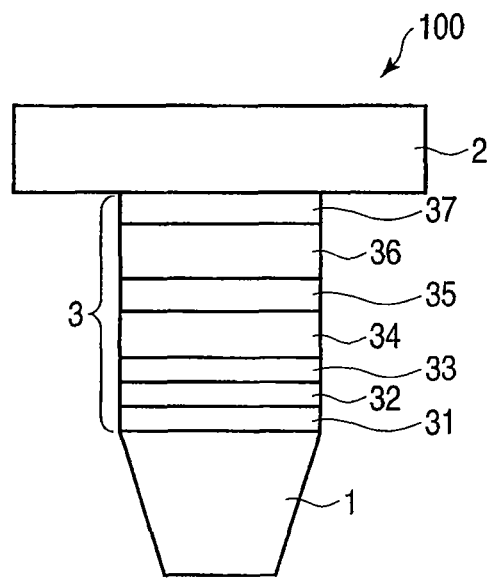
F I G. 1
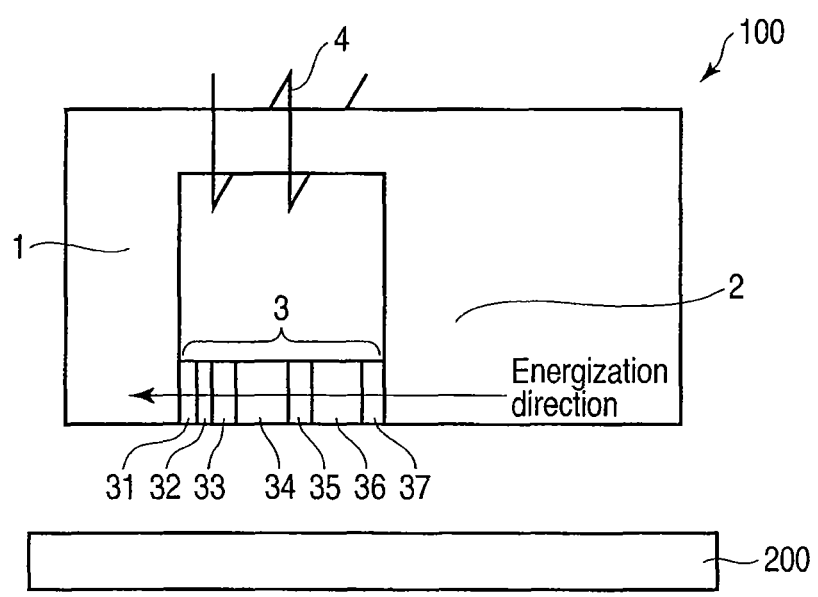
F I G. 2

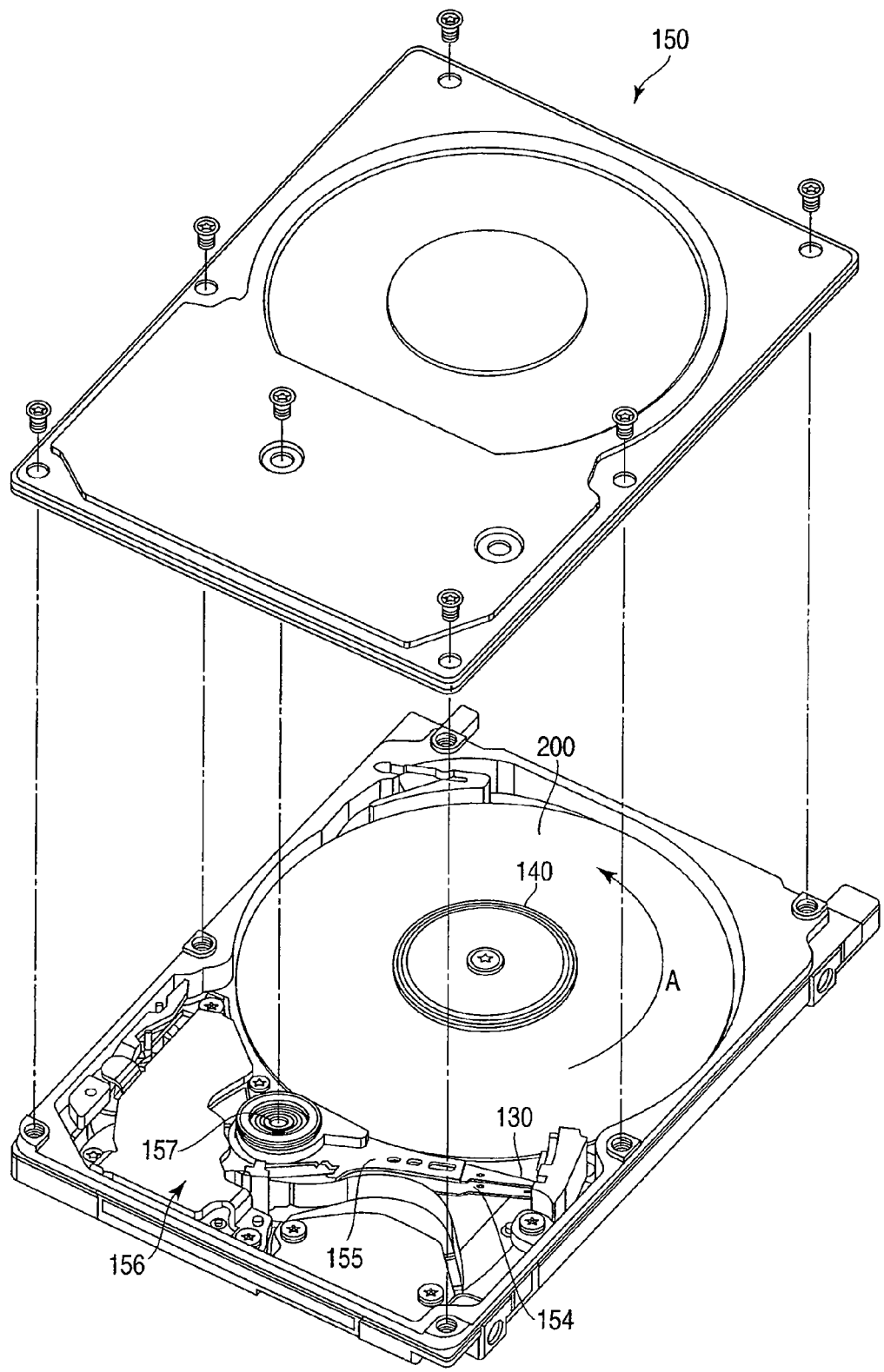
F I G. 4

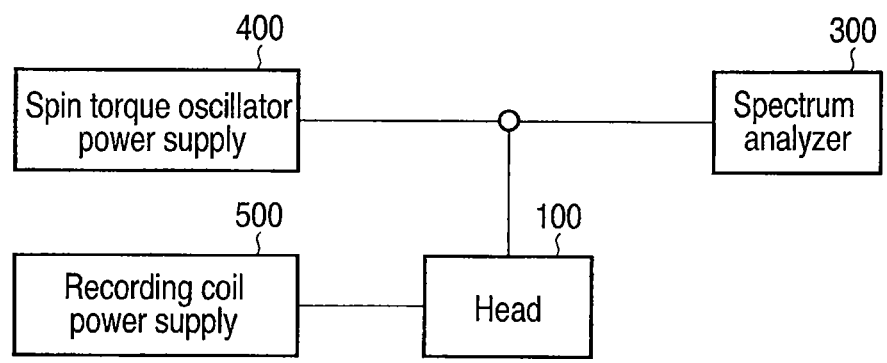
F I G. 5A
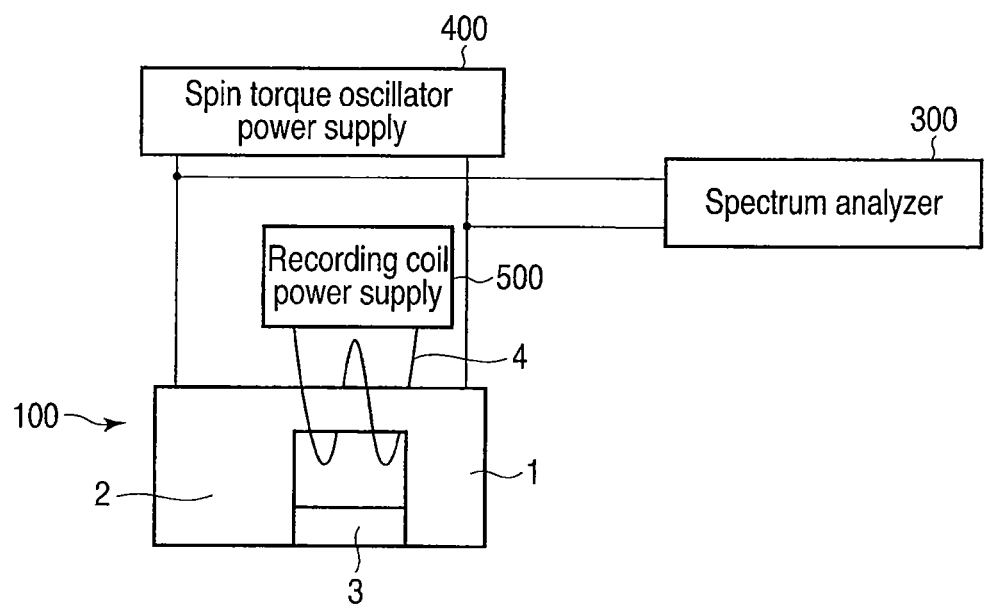
F I G. 5B

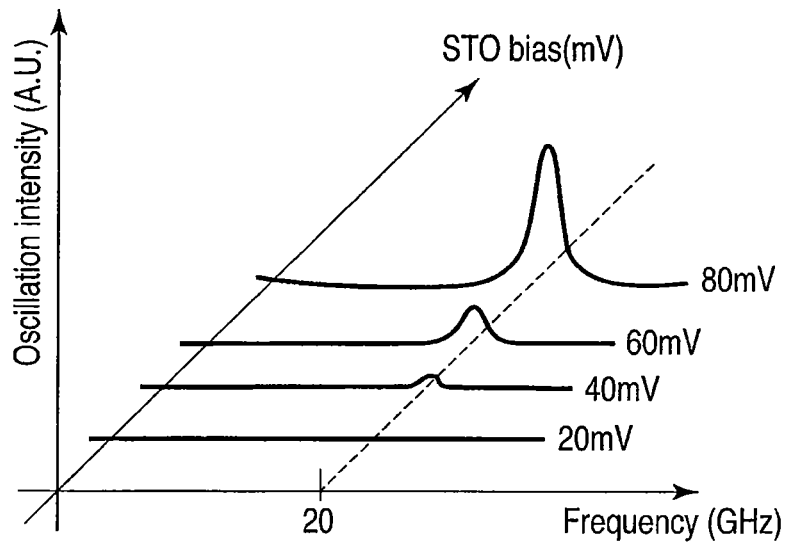
F I G. 6A
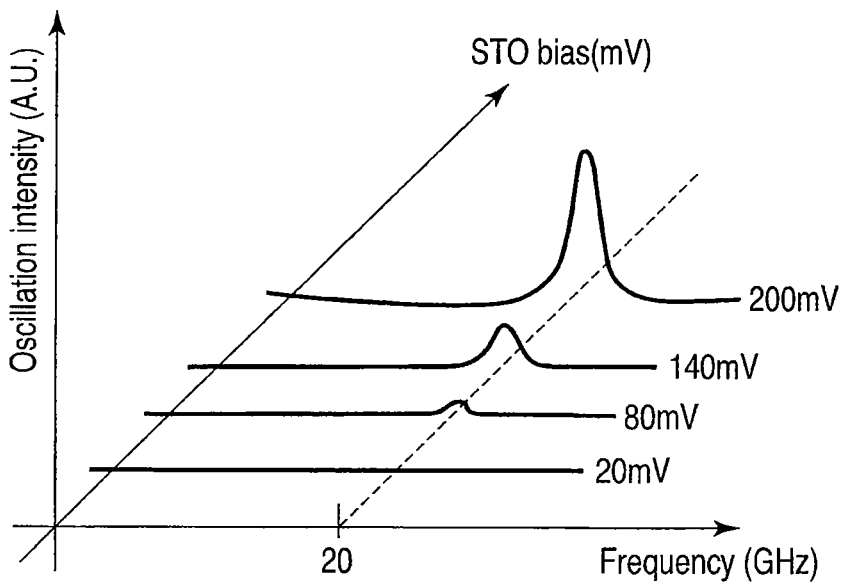
F I G. 6B

MAGNETIC RECORDING HEAD AND MAGNETIC RECORDING APPARATUS

CROSS-REFERENCE TO RELATED APPLICATIONS

This application is based upon and claims the benefit of priority from Japanese Patent Application No. 2010-150350, filed Jun. 30, 2010; the entire contents of which are incorporated herein by reference.

FIELD

Embodiments described herein relate generally to a magnetic recording head using a spin torque oscillator and a magnetic recording apparatus.

BACKGROUND

A conventional magnetic recording head uses a spin torque oscillator including an oscillation layer, a spacer, a spin injection layer which is a perpendicular magnetic anisotropic layer, and a perpendicular magnetic anisotropic layer stacked on the oscillation layer. In the magnetic recording head, since spin injection for oscillating the oscillation layer is performed only by the single spin injection layer, when a magnetic volume of the oscillation layer is increased to increase a high-frequency magnetic field intensity, spin torque necessary for oscillation cannot be sufficiently obtained.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a view of a magnetic recording head according to an embodiment as viewed from a medium opposing surface;

FIG. 2 is a sectional view showing a magnetic recording head according to the embodiment;

FIG. 4 is an exploded perspective view showing a magnetic recording apparatus according to an embodiment;

FIGS. 5A and 5B are views showing a method of measuring an oscillation spectrum using a spectrum analyzer; and FIGS. 6A and 6B are views showing oscillation intensities of Example and Comparative Example.

DETAILED DESCRIPTION

Figure 3:
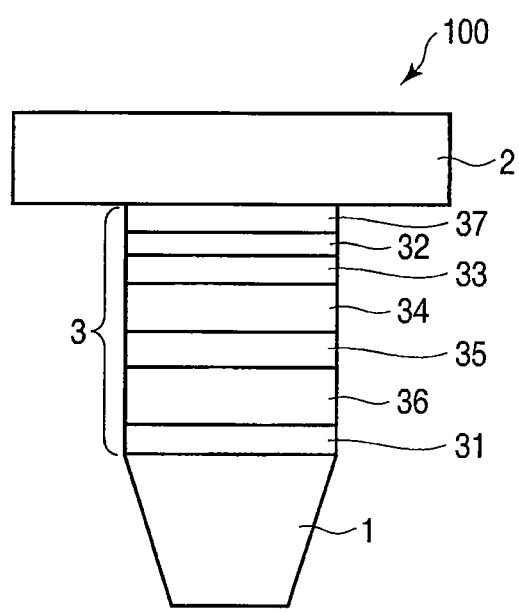
FIG. 3 is a view of a magnetic recording head according to another embodiment as viewed from a medium opposing surface.

Various embodiments will be described hereinafter with reference to the accompanying drawings.

In general, according to one embodiment, a magnetic recording head comprises a main magnetic pole generating a recording magnetic field in a magnetic recording medium, a return yoke paired with the main magnetic pole, and a spin torque oscillator interposed between the main magnetic pole and the return yoke and including a spin injection layer, an oscillation layer, a nonmagnetic metal layer, and spin assist layer stacked in this order, wherein the nonmagnetic metal layer comprises at least one metal selected from the group consisting of Cu, Au, Ag, Al, Pd, Pt, Os, and Ir, and wherein the spin assist layer is a soft magnetic layer whose saturation magnetic flux density (Bs), diamagnetic field coefficient (N) and gap magnetic field (Hg) show a relationship expressed by:

$$Bs \times N > Hg.$$

First Embodiment

FIG. 1 is a view of a magnetic recording head 100 according to a first embodiment as viewed from a medium opposing surface. A spin torque oscillator 3 is interposed between a main magnetic pole 1 and a return yoke 2. The spin torque oscillator 3 has a structure in which a metallic under layer 31, a spin assist layer 32, a nonmagnetic metal layer 33, an oscillation layer 34, an intermediate layer 35, a spin injection layer 36, and a metal cap layer 37 are stacked in this order. The metallic under layer 31 is in contact with the main magnetic pole 1, and the metal cap layer 37 is in contact with the return yoke 2.

FIG. 2 is a view of the magnetic recording head 100 according to the first embodiment as viewed from a side surface. The spin torque oscillator 3 is interposed between the main magnetic pole 1 and the return yoke 2, and has a structure in which respective layers are stacked as in FIG. 1. A coil 4 is wound around an upper portion of the magnetic recording head 100. The magnetic recording head 100 is disposed on a magnetic recording medium 200.

In the magnetic recording head 100, the coil 4 is connected with a recording coil power supply. When a current flow from the recording coil power supply to the coil 4, a recording magnetic field, which uses the main magnetic pole 1 and the return yoke 2 as a magnetic path, is generated. A magnetic record is rewritten in the magnetic recording medium 200 by the recording magnetic field. Further, the main magnetic pole 1 and the return yoke 2 are connected to a spin torque oscillator power supply, and the main magnetic pole 1 and the return yoke 2 each function also as an electrode. When a current is caused to flow from the spin torque oscillator power supply to the main magnetic pole 1 and the return yoke 2, a current flows in the spin torque oscillator 3 in a film thickness direction of stacked layers as shown in FIG. 2, and magnetization of the oscillation layer 34 is oscillated by spin torque. Since a coercive force of the magnetic recording medium 200 is lowered by the oscillation, a recording magnetic field intensity necessary to rewrite the magnetic record is lowered. An increase in a gap magnetic field generated between the main magnetic pole 1 and the return yoke 2 more increases the oscillation frequency.

The spin assist layer 32 is a soft magnetic layer and magnetized in an in-plane direction. Therefore, the spin assist layer 32 applies a magnetic moment in the in-plane direction to the oscillation layer 34. With this operation, since a rotation of magnetization in the oscillation layer 34 is accelerated, a high oscillation intensity can be obtained. Accordingly, a voltage, which is necessary to obtain a certain oscillation intensity, is lowered.

It is necessary that a direction of magnetization in the spin assist layer 32 not change to the film thickness direction even if the spin assist layer 32 is influenced by a magnetic field (gap magnetic field) generated between the main magnetic pole 1 and the return yoke 2. Accordingly, it is necessary in the spin assist layer 32 that a diamagnetic field in the film thickness direction is larger than the gap magnetic field. That is, in the spin assist layer 32, a relationship shown by the following expression is established as to a saturation magnetic flux density (Bs), a diamagnetic field coefficient (N), and the gap magnetic field (Hg).

$$Bs \times N > Hg$$

As shown by the expression, the saturation magnetic flux density Bs is preferably large in the spin assist layer 32. A material having a large saturation magnetic flux density Bs is preferably selected as a material of the spin assist layer 32. Since the gap magnetic field reaches 20 kOe at maximum, the saturation magnetic flux density Bs of the spin assist layer is preferably 2T or more. Ferromagnetic metal can be used as a material of the spin assist layer 32, and, for example, Fe, Co, or Ni or an alloy obtained by combination of any of Fe, Co, and Ni can be used. $Fe_xCo_{1-x}$ alloy (x is 0.25 or more) is preferably used. It is preferable that the spin assist layer 32 has a composition, 90 at. % or more of which is Fe, Co, or Ni or an alloy thereof.

As shown by the expression, it is preferable in the spin assist layer 32 that the diamagnetic field coefficient N be large. The diamagnetic field coefficient N is in inverse correlation with a thickness of the spin assist layer 32 and is in correlation with a film surface size. Accordingly, the diamagnetic field coefficient N can be increased by appropriately setting a shape of the spin assist layer 32. To achieve the large diamagnetic field coefficient N, the thickness of the spin assist layer 32 is preferably as thin as possible. However, when the spin assist layer 32 is excessively thin, a crystal property is disturbed and the magnetization is lowered, and an effect of spin torque is also lowered. To keep the crystal property, the thickness of the spin assist layer 32 is preferably set to 0.5 nm or more and is more preferably set to 1 nm or more. In contrast, when the spin assist layer 32 is excessively thick, a high-frequency magnetic field generated from the oscillation layer 34 is cancelled. Accordingly, the thickness of the spin assist layer 32 is preferably less than the thickness of the oscillation layer 34. When, for example, a ratio of the thickness of the spin assist layer 32 to a film surface size thereof is set to $\frac{1}{10}$ or less, the diamagnetic field coefficient N becomes approximately 1. In this case, the relationship of the expression can be achieved by selecting a material which exhibits the saturation magnetic flux density Bs larger than the gap magnetic field Hg.

The nonmagnetic metal layer 33 has a role that transmits spin torque to the oscillation layer 34. Accordingly, a metal suitable for spin transmission is used. Specifically, at least one metal selected from the group consisting of Cu, Au, Ag, Al, Pd, Pt, Os, and Ir is used. The nonmagnetic metal layer 33 is set to a thickness of 2 nm to 10 nm.

The main magnetic pole 1 can be made of an alloy of metals selected from the group consisting of Fe, Co, and Ni. A portion of the main magnetic pole 1 positioned to the magnetic recording medium side may be patterned on a width approximately similar to a data track width. With this configuration, a magnetic field can be concentrated on a region corresponding to the data track width.

The return yoke 2 is disposed facing the main magnetic pole 1. The return yoke 2 has a role of closing the magnetic path by returning a magnetic field, which travels from the main magnetic pole 1 to the magnetic recording medium, to a magnetic recording head.

The oscillation layer 34 generates the high-frequency magnetic field by the rotation of magnetization performed by the spin torque. To generate a large high-frequency magnetic field, it is preferable that a product (magnetic volume) of the magnetization of the oscillation layer 34 and the thickness thereof be large. A metal magnetic substance selected from the group consisting of Fe, Co, and Ni or an alloy obtained by combination of any of Fe, Co, and Ni can be used as the oscillation layer 34. In particular, it is preferable to use a Fe—Co alloy with a thickness of 10 nm to 20 nm. Further, an alloy of Fe, Co, Ni, and the like added with a nonmagnetic element may be used. A Heusler alloy such as FeCoMnSi and FeCoAlSi can be used as a material of the oscillation layer added with the nonmagnetic element. Since the Heusler alloy has a very high spin polarizability, it is effective to reduce a drive current of the spin torque oscillation. The oscillation layer may be formed of two or more magnetic layers. Specifically, when the Heusler alloy is formed in the interfaces on the intermediate layer side and further an FeCo alloy is formed on a side opposite to the intermediate layer, a sufficient magnetic volume and a preferable reduction of a spin torque drive voltage can be realized together.

The spin injection layer 36 is made of a metal magnetic substance having a perpendicular magnetic anisotropy. Specifically, a CoPt alloy, a CoPd alloy, a Co/Pt artificial lattice, a Co/Pd artificial lattice, a Co/Ni artificial lattice, a Co/Fe artificial lattice, and the like can be used. Further, the spin injection layer may not be formed only of a perpendicular magnetic anisotropic film. Specifically, the spin injection layer may be configured by being stacked with a soft magnetic layer as long as the perpendicular magnetic anisotropy is maintained. Since the perpendicular magnetic anisotropic film is inferior to a soft magnetic FeCo alloy and the Heusler alloy in view of a spin polarizability, the perpendicular magnetic anisotropy and a preferable reduction of spin torque drive voltage can be realized together by forming the soft magnetic FeCo alloy or the Heusler alloy in the interfaces on the intermediate layer side of the spin injection layer. When the magnetic recording head 100 is driven, a direction of a gap magnetic field is switched in association with a direction of a recording magnetic field. Accordingly, it is necessary for the spin injection layer 36 to change the direction of the magnetic field following the direction of the gap magnetic field so that the spin injection layer 36 exhibits a stable spin injection effect. Accordingly, it is necessary that magnetic anisotropy of the spin injection layer 36 be smaller than the gap magnetic field.

The metallic under layer 31 is formed as a ground layer of the spin assist layer 32. A layered structure of Ta/Ru, Ta/Cu, and the like or a Ni—Fe—Cr alloy, and the like can be used as the metallic under layer 31. When the main magnetic pole 1 functions as a lower electrode, the metallic under layer 31 has a role of electrically connecting the spin assist layer 32 to the main magnetic pole 1. The metallic under layer 31 may be omitted.

As the intermediate layer 35, a material similar to the nonmagnetic metal layer 33 can be used. The intermediate layer 35 may be omitted.

The metal cap layer 37 has a role of electrically connecting the spin injection layer 36 to an upper electrode. As the metal cap layer 37, a metal material can be used. When the return yoke 2 functions also as the upper electrode, the metal cap layer 37 has a role of electrically connecting the spin injection layer 36 to the return yoke 2. The metal cap layer 37 may be omitted.

The coil 4 is wound around a part of the magnetic path passing through the main magnetic pole 1 and the return yoke 3. As the coil, a metal material having a high conductive property can be used.

Second Embodiment

FIG. 3 is a view of a magnetic recording head 100 according to a second embodiment as viewed from a medium opposing surface. The second embodiment is different from the first embodiment in that a spin torque oscillator 3 is stacked in the order different from that of the first embodiment. That is, in the second embodiment, the spin torque oscillator 3 has a structure in which a metallic under layer 31, a spin injection layer 36, an intermediate layer 35, an oscillation layer 34, a nonmagnetic metal layer 33, a spin assist layer 32, and a metal cap layer 37 are stacked in this order. As in the first embodiment, since the spin assist layer 32 accelerates a rotation of magnetization in the oscillation layer 34, a high oscillation intensity can be obtained. Materials and conditions of respective components in the second embodiment are common to those in the first embodiment.

<As to Magnetic Recording Medium>

A magnetic recording medium used in a magnetic recording apparatus according to an embodiment is not particularly limited and an arbitrary magnetic recording medium can be used. A magnetic recording medium, in which, for example, a substrate, a soft magnetic layer, a nonmagnetic layer, a recording layer, and a protective layer are sequentially stacked from below, can be used. In this case, good perpendicular magnetic recording can be achieved. In particular, a patterned medium (DTR medium, BPM and the like), in which a recording layer is formed in a specific pattern in an in-plane direction, can be also used.

<As to Magnetic Recording Apparatus>

FIG. 4 is a perspective view showing a magnetic recording apparatus 150 comprising the magnetic recording head according to an embodiment.

As shown in FIG. 4, the magnetic recording apparatus 150 is of a type using a rotary actuator. The magnetic recording medium 200 is attached to the spindle motor 140, and is rotated in the direction of arrow A by a motor (not shown) that responds to control signals from a drive controller (not shown). The magnetic recording apparatus 150 may comprise a plurality of magnetic recording media 200.

The head slider 130 configured to read from and write to the magnetic recording medium 200 is attached to the tip of the film-like suspension 154. The head slider 130 has the magnetic recording head according to the embodiment mounted near the tip thereof. When the magnetic recording medium 200 rotates, the air bearing surface (ABS) of the head slider 130 is held at a predetermined height so as to fly over the surface of the magnetic recording medium 200 under a balance of pressing force of the suspension 154 and the pressure produced on the air bearing surface (ABS) of head slider 130.

The suspension 154 is connected to one end of an actuator arm 155 which has a bobbin part holding a driving coil (not shown). A voice coil motor 156, a kind of linear motor, is provided on the other end of the actuator arm 155. The voice coil motor 156 is formed of the driving coil (not shown) wound around the bobbin of the actuator arm 155 and a magnetic circuit including a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic recording head can be accessed any position on the magnetic recording medium 200.

EXAMPLES

A magnetic recording head according to an embodiment and a conventional magnetic recording head were manufactured and oscillation spectra thereof were measured.

As an example, a magnetic recording head (FIG. 1) according to the first embodiment was manufactured. The following layers were sequentially stacked on a main magnetic pole 1.

Metallic under layer 31: 3 nm Ta/5 nm Ru
Spin assist layer 32: 2 nm $Fe_{50}Co_{50}$
Nonmagnetic metal layer 33: 2 nm Cu
Oscillation layer 34: 15 nm $Fe_{50}Co_{50}$
Intermediate layer 35: 2 nm Cu
Spin injection layer 36: (0.2 nm Co/0.6 nm Ni) stacked 15 times
Metal cap layer 37: 2 nm Ta After lamination, a spin torque oscillator 3 was formed by performing patterning so that a film surface was made to a size of 50 nm square. Further, the main magnetic pole 1 and the spin torque oscillator 3 were processed so that they have the same width of 50 nm.

As Comparative Example, a magnetic recording head, in which a spin assist layer 32 and a nonmagnetic metal layer 33 were not disposed, was manufactured. The following layers were sequentially stacked on a main magnetic pole 1.

Metallic under layer 31: 3 nm Ta/5 nm Ru
Oscillation layer 34: 15 nm $Fe_{50}Co_{50}$
Intermediate layer 35: 2 nm Cu
Spin injection layer 36: (0.2 nm Co/0.6 nm Ni) stacked 15 times
Metal cap layer 37: 2 nm Ta Comparative Example was manufactured like the example except that the spin assist layer 32 and the nonmagnetic metal layer 33 were not disposed. Accordingly, the main magnetic pole 1 and the spin torque oscillator 3 had the same width of 50 nm.

Thereafter, as shown in FIGS. 5A and 5B, oscillation spectra of the magnetic recording heads were measured using a spectrum analyzer 300. FIG. 5A shows a conceptual view of measurement performed by the spectrum analyzer 300. A spin torque oscillator power supply 400 and a recording coil power supply 500 are connected to a magnetic recording head 100. The spin torque oscillator power supply 400 supplies a current for oscillating the spin torque oscillator 3, and the recording coil power supply 500 supplies a current for generating a recording magnetic field. The spectrum analyzer 300 is connected to a circuit including the spin torque oscillator power supply 400 and the magnetic recording head 100. A resistance is changed in the circuit, which includes the magnetic recording head 100 and the spin torque oscillator power supply 400, by oscillation in the spin torque oscillator 3, and the change of the resistance is recorded by the spectrum analyzer 300. FIG. 5B shows a more specific configuration. Both the poles of the spin torque oscillator power supply 400 are connected to the main magnetic pole 1 and the return yoke 2, respectively. The recording coil power supply 500 is connected to both the ends of a coil 4. One of both the poles of the spectrum analyzer 300 is connected to a line of the spin torque oscillator power supply 400 and the main magnetic pole 1, and the other pole is connected to a line of the spin torque oscillator power supply 400 and the return yoke 2.

A current of 40 mA was caused to flow to the coils 4 of the respective magnetic recording heads, and at the same time, a bias voltage was applied to the spin torque oscillators 3. Outputs, which were obtained as a magnetic resistance effect of the spin torque oscillators 3, were amplified, and oscillation spectra were observed by the spectrum analyzer 300.

FIG. 6A shows a result of measurement of the example. As a bias voltage to the spin torque oscillator 3 was increased, acute peaks could be observed in the vicinity of 20 GHz. Although a necessary oscillation frequency depends on magnetic characteristics of a magnetic recording medium, when a magnetic recording medium having a magnetic anisotropy of 13 kOe is used, a frequency of about 20 GHz is preferable. The magnetic recording head 100 according to the example showed a frequency suitable therefor. An optimum application voltage by which the frequency could be obtained was 80 mV, and a maximum value of an oscillation peak could be also obtained by this voltage.

FIG. 6B shows a result of measurement of Comparative Example. As in the example, although peaks were observed in the vicinity of 20 GHz, a bias voltage for obtaining a maximum amplitude was greatly increased. This was a load which deteriorates long-term reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:

a main magnetic pole generating a recording magnetic field in a magnetic recording medium;

a return yoke paired with the main magnetic pole; and a spin torque oscillator interposed between the main magnetic pole and the return yoke and including a spin injection layer, an oscillation layer, a nonmagnetic metal layer, and spin assist layer stacked in this order, wherein the nonmagnetic metal layer comprises at least one metal selected from the group consisting of Cu, Au, Ag, Al, Pd, Pt, Os, and Ir, wherein the spin assist layer is a soft magnetic layer whose saturation magnetic flux density (Bs), diamagnetic field coefficient (N) in a film thickness direction and gap magnetic field (Hg) show a relationship expressed by:

$Bs \times N > Hg$, and wherein the spin assist layer has a thickness which is 0.5 nm or more and thinner than that of the oscillation layer.

2. A magnetic recording apparatus comprising:

a perpendicular magnetic recording medium; and the magnetic recording head of claim 1.

* * * * *